Figure 1:
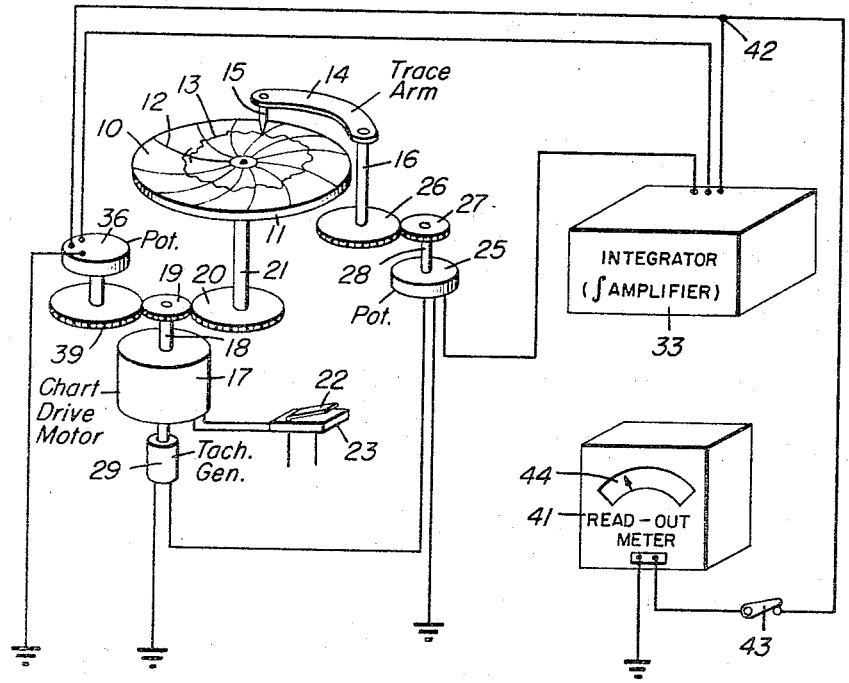

INVENTORS
Tom A. Woodard
Thomas S. McIntosh

BY Adolph C. Hugin
ATTORNEY

United States Patent Office 3,307,019
Patented Feb. 28, 1967

3,307,019
ELECTRONIC ANALOG TRACE AVERAGER
Tom A. Woodard, Shreveport, La., and Thomas S. McIntosh, Stanford, Calif., assignors to United Gas Corporation, a corporation of Delaware
Filed Sept. 19, 1963, Ser. No. 310,002
7 Claims. (Cl. 235—61.6)

This invention relates to chart trace averages and more particularly to a manually operable electronic analog trace averager.

Instruments for the measurement and recordation of various quantities, particularly physical values such as pressure, temperature, specific gravity, etc., are widely used in industry. The value of the quantity often is recorded as a trace formed by an inscribing device, such as a pen, on suitably graduated paper, conventionally comprising a circular or strip chart. The trace of the quantity or variable is recorded by such devices as a function of chart motion which normally is representative of time. The motion of such charts may be linear or rotational, depending upon whether the chart is of the strip or circular type.

In many instances, the quantities which are recorded are used in performing calculations, and the accepted computational form for using such recorded quantities is a time-averaged value. Such a time-averaged value is simply an average of the variable quantity for the period of time as represented by the motion of the chart for which the quantity was recorded as a trace on the chart. Various types of mechanical devices have been used for obtaining such a time-averaged value of a chart trace. These usually have been mechanical and have been subject to various disadvantages resulting from inaccuracies in the mechanism providing the mechanical average.

An object of the present invention is to provide an improved manually operable chart trace averager.

Another object of the present invention is to provide an improved electronic analog trace averager.

Further objects and advantages of this invention will become apparent from the following description referring to the accompanying drawing, and the features of novelty which characterize this invention will be pointed out with particularity in the claims appended to and forming a part of this specification.

In carrying out the present invention, a tracing arm is provided for manually following a trace representative of a quantity on a circular or strip chart. This tracing arm is correlated to a drive of the chart to provide for an integration of the function represented by the trace on the chart, and an electronic analog integrator performs this integrating function and is connected in the system for advancing the chart so as to divide the integrated result by the time function of the chart, as represented by the advance thereof during the tracing of the record, so as continuously to provide an average of the function as represented by the amount of the chart which has been traced by the tracing arm. In this manner, the procedure of determining the average of a quantity may be carried out for any desired length of the chart period, and the average of the quantity will always be available.

The average of the quantity may be readily made available by providing a suitable calibrated instrument or meter for indicating this value as provided by the system. In some instances, it may be desirable not to have the instrument or meter continuously connected in the system, and, in such cases, a suitable read-out button or switch may be provided so that the time-averaged value of the chart variable may be read simply by closing the button or switch and reading the time-averaged value on the instrument or meter. Various types of instruments for indicating this time-averaged value may be utilized, such as a simple galvanometer type voltmeter properly graduated in terms of the trace variable or even in abstract values which may be interpreted in terms of the trace variable simply by multiplying the abstract value by a suitable constant. In some instances, the time-averaged value may be supplied directly to other equipment, such as a computer, and the read-out switch may be closed by any suitable means either manually or in response to a signal received from the computer or other equipment to which the value is to be supplied.

Figure 2:
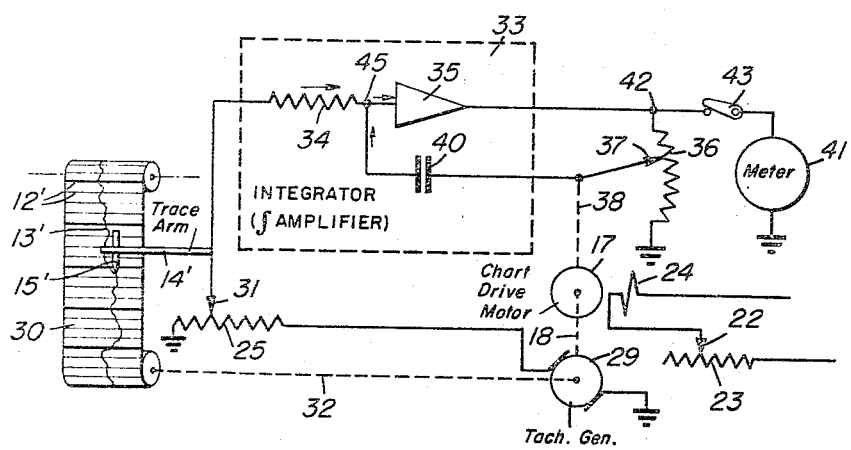

In the drawing:

FIG. 1 is a schematic representation of a manually operable electronic analog chart trace averager embodying the present invention and shown in a device for averaging a circular type chart; and FIG. 2 is another schematic diagram illustrating in greater detail the electrical features of an electronic analog chart trace averager, such as that shown in FIG. 1, illustrated in this figure as applied to a device for averaging a strip chart.

Referring to the drawing, an improved manually operable electronic analog chart trace averager is illustrated in both FIGS. 1 and 2 for continuously providing a time average of a trace. The electrical aspects of the system are substantially the same whether applied to a device for providing an average of a circular chart trace or of a strip chart trace. Corresponding parts in both of these figures are similarly numbered, and the details shown in the two figures are interchangeable except for the chart drive and carrier and the tracing arm.

As shown in FIG. 1, a circular chart 10 is shown supported on a chart turntable 11. This chart may be of conventional type, having suitable outwardly extending time indicating lines 12 forming the abscissa of the chart, and a trace 13 inscribed thereon for the measurement of any suitable quantity, indicated by the ordinates of the chart. A tracing arm 14 is provided with a suitable tracing pointer 15 for following the trace 13 on the chart 10. In the construction shown in FIG. 1, the tracing arm 14 is rigidly mounted on a suitable shaft 16 and is manually operable so that the operator of the averager can readily follow a trace with the pointer 15. The arm 14 is made of a length and the shaft 16 is rotatably supported in suitable manner and at a position such that the pointer 15 of the tracing arm will move along the same arc as the arcuate lines 12 representing the time function abscissa of the chart. In this manner, the position of the pointer 15 will always represent a given ordinate for a predetermined time position of the chart 10.

In order to obtain an average of the trace value over a period of time, the chart turntable 11 is adapted to be advanced under control of the operator. Such an advance is conveniently provided by rotating the chart turntable 11 by a suitable variable speed drive motor 17. This drive motor 17 may be arranged to rotate the turntable 11 through any suitable drive, which is represented in FIG. 1 as comprising a motor shaft 18 driven by the motor 17 which transmits power from the motor through gears 19 and 20 to a chart turntable drive shaft 21. The speed of the motor 17 may be controlled in any suitable manner, as by a foot pedal 22 which may be used to vary the field strength of the motor if it be a direct current motor. This detail is illustrated in FIG. 2 as comprising a field rheostat 23 which is adapted to be varied by the foot pedal 22 to control the energization of the chart drive motor field exciting winding 24. In this manner the chart 10 may be advanced by operating the drive motor 17, and the tracing arm pointer 15 can then follow variations in the quantity represented by the chart trace 13 as the chart is rotated.

Movement of the tracing arm 14, as the pointer 15 follows a trace 13, will provide a corresponding angular displacement or turning of the tracing arm shaft 16, and this angular displacement is indicative of the quantity represented by the ordinates of the trace 13 on the chart 10. Thus, the position of the tracing arm 14 is continuously representative of the instantaneous value of the trace 13. In order to utilize this function of the tracing arm, it is mechanically connected to a suitable potentiometer 25 through a suitable driving connection, such as gears 26 and 27, for mechanically driving a potentiometer shaft 28 operably connected to a suitable contactor or other variable voltage connection in the potentiometer, such that the output voltage of the potentiometer is continuously modified in accordance with the position of the tracing arm 14. In this manner the output voltage of the potentiometer is continuously representative of the instantaneous value of the trace ordinate corresponding to the tracing arm pointer 15 position for a specified time abscissa of the chart.

In order to provide the desired input voltage to the potentiometer 25 which is to be modified by the potentiometer in accordance with displacement of the tracing arm 14, a suitable tachometer generator 29 is mechanically driven by the motor 17 through any suitable means, so that the voltage of the tachometer generator 29 is continuously representative of the speed of operation of the chart drive motor 17 and, therefore, of the chart turntable 11. Thus voltage of the tachometer generator, which is impressed as the input voltage on the tracing arm potentiometer 25, is continuously representative of the angular displacement of the chart 10 as a function of time. This angular displacement may be represented by the term $d\theta/dt$, so that the tachometer generator voltage may be represented as $$K\frac{d\theta}{dt}$$

K being a generator design constant. In this manner the output voltage of the tracing arm potentiometer 25 is continuously proportional to the product of the tachometer generator output voltage $$\left(K\frac{d\theta}{dt}\right)$$

and the angular displacement of the tracing arm 14. This latter quantity may be represented by the variable quantity A, so that the output voltage of the tracing arm potentiometer 25 is represented by the modified voltage $$AK\frac{d\theta}{dt}$$

of the tachometer generator.

In the FIG. 2 embodiment, wherein the averager is adapted to read and average traces on a strip chart, the tracing arm 14' normally would not be mounted on a rotatable shaft, but would be translatable transversely of a strip chart 30 along the ordinates of such a chart, so that the tracing arm pointer 15' could readily follow variations in a trace 13' on the strip chart 30. In such an embodiment, the time increments, which form the abscissa of the chart, conventionally are indicated by transversely extending lines 12', and the tracing arm 14' is mechanically connected in any suitable manner to a contactor or variable voltage connection element 31 of a potentiometer 25, such that the output voltage of the potentiometer 25 will be modified in accordance with the displacement or position of the tracing arm and its pointer 15' in the same manner as in the FIG. 1 embodiment.

In this construction the strip chart 30 is adapted to be driven by the variable speed chart drive motor 17 through any suitable means, as by a mechanical connection provided by the motor shaft 18 and other suitable mechanical connections 32. In this way the operator of the averager can control the speed at which the strip chart 30 is advanced by controlling the speed of the drive motor 17 through any suitable means, such as the field rheostat 23. As in the FIG. 1 embodiment, the tachometer generator 29 is driven by the motor 17 at a speed proportional to the speed of the advance of the strip chart 30, and the tachometer generator voltage is therefore proportional to the speed of advance of the chart 30, so that it may be represented by the term $$K\frac{d\theta}{dt}$$

where $\theta$ is the abscissa of the chart 30. This is the input voltage to the tracing arm potentiometer 25 and is modified by the position A of the tracing arm 14', so that the output voltage of the tracing arm poteniometer 25 may be expressed, as in the FIG. 1 embodiment, by the term $$AK\frac{d\theta}{dt}$$

In order to obtain a summation of the variable quantity represented by the traces 13 or 13' on the circular and strip charts respectively, so that a time average of the value of these traces may be obtained for any desired period of time, the output of the tracing arm potentiometer 25 is impressed as the input voltage on any suitable type of integrator. A suitable integrator for the purposes of the present invention preferably is a relatively high gain direct current electronic amplifier integrator 33. Such integrators are described in detail in Electronic Analog Computers, 2nd edition, G. A. Korn and T. M. Korn, McGraw-Hill Book Co., pages 8–26, and 171–189. Preferably, a feed back type integrator is utilized, as this provides a convenient way for dividing the summation or interpreted results obtained from the integrator by the time displacement of the chart, thereby giving a direct reading of the average of the variable quantity represented by the trace for any particular section of the chart which has been read by the system. This type of feed back integrator is particularly described in Electronic Analog Computers (supra), pages 175–184, and is represented schematically in FIG. 2 in the same type of block diagram as is shown on pages 178 and 183. This type of integrator includes a resistance 34 to which the input voltage $$AK\frac{d\theta}{dt}$$

from the tracing arm potentiometer 25 is fed, and the resistance 34 is connected to the input of a high gain direct current amplifier 35 of the type described in Electronic Analog Computers (supra) and illustrated in detail on pages 176–178. The output of the amplifier 35 is connected to the input of a potentiometer 36, which is provided with a suitable variable voltage connection or contactor 37 which is adapted to be driven in any suitable manner by the chart drive motor 17, so that the position of the contactor 37 of the potentiomeer 36 is always directly proportional to the displacement or advance of the chart 10 or 30, FIGS. 1 and 2 respectively. This drive of the contactor 37 of the potentiometer 36 may be provided in any suitable manner by a mechanical connection 38. In FIG. 1, this comprises a gear 39 driven by the motor gear 19.

In order to provide a continuous division of the integrated measurement by the amplifier 35, a feed back condenser 40 is provided with one side thereof connected to the time function potentiometer contactor 37, and the other side thereof connected to the input of the amplifier 35. In this manner, the input to the amplifier depends upon both the voltage $$AK\frac{d\theta}{dt}$$

impressed on the integrator and upon the feed back voltage impressed thereon by the time function potentiometer 36 through the feed back condenser 40. This circuit provides a resultant output voltage for the integrator 33 which is continuously proportional to the time average of the variable quantity represented by the trace 13 or 13', FIG. 1 or 2, respectively.

This resultant voltage may be read in any suitable manner by connecting a read-out meter 41 to the output terminal 42 of the integrator 33. The meter may be connected directly to this output terminal or may be connected thereto through a suitable button or switch 43 which may be manually operable or may be operable in response to a predetermined condition or signal in an electrical system, such as a signal from a computer requesting that it be supplied with the information under predetermined conditions. Such a control of the switch 43 is not specifically a part of the present invention and therefore is not illustrated in the drawing. The meter 41 may be provided with a direct reading scale 44 which is calibrated in terms of the quantity represented by the traces 13 and 13' or may be calibrated in abstract values which can be readily converted into the quantities represented by the traces 13 and 13' by multiplying the abstract value by a predetermined constant.

The accuracy of the time average value as represented by the output voltage on the terminal 42 of the integrator 33 can be very readily demonstrated by a consideration of the electrical factors involved in the system shown in both of the figures of the drawing. According to Kirchhoff's law, the sum of the currents entering a point in a circuit is equal to the sum of the currents leaving that point. Considering for the moment the input terminal 45 to the integrating amplifier 35, it will be observed that the currents flowing in the directions of the arrows shown in FIG. 2 are represented by the equation:

(1) $$I_{35} = I_{34} + I_{40}$$

In this equation $I_{35}$ represents the grid current of the amplifier 35 and this current is determined by the equation:

(2) $$I_{35} = \frac{E_{45}}{R_G}$$

where $E_{45}$ is the voltage input to the grid of the amplifier 35 and $R_G$ is the finite input resistance of the amplifier. This latter resistance can be considered as a resistor to ground from the summing point 45, as explained in Electronic Analog Computers (supra), pages 183–184. Since the summing point 45 is not at ground potential but at the voltage $$AK\frac{d\theta}{dt} - E_{45}$$

the current $I_{34}$ through the resistor 34 may be represented by the equation:

(3) $$I_{34} = \frac{1}{R_{34}}\left(AK\frac{d\theta}{dt} - E_{45}\right)$$

The current $I_{40}$ of the feed back condenser 40 may be expressed as:

(4) $$I_{40} = \frac{dq}{dt} = K_1 C\theta \frac{d\overline{A}}{dt}$$

This equation is derived from the fact that the charge $q$ on the condenser is equal to the product of the capacitance C and the voltage across the capacitor. This latter voltage is the voltage of the amplifier 35 times the displacement or abscissa representing the advance of the chart 10 or 30, FIGS. 1 and 2 respectively. The output voltage of the amplifier may be represented as $\overline{A}$ and the displacement advance of the chart by $\theta$. Thus the fraction of the output voltage of the amplifier 35 which is fed back across the capacitor 40 due to the displacement of the potentiometer contactor 37 resulting from the advance of the chart 10 or 30 may be represented as $K_1\overline{A}\theta$, $K_1$ being a design constant of the amplifier 35. Therefore, $q$ in Equation 4 is equal to $CK_1\theta\overline{A}$ which when substituted yields the final form of (4).

Substituting Equations 2, 3, and 4 in Equation 1:

(5) $$\frac{E_{45}}{R_G} = \frac{1}{R_{34}}\left(AK\frac{d\theta}{dt} - E_{45}\right) + K_1 C\theta\frac{d\overline{A}}{dt}$$

Rearranging this equation:

(6) $$K_1 C\theta\frac{d\overline{A}}{dt} = \frac{E_{45}}{R_G} - \frac{1}{R_{34}}\left(AK\frac{d\theta}{dt} - E_{45}\right)$$

For most practical applications, $E_{45}$ is very small, and the terms containing it can be neglected, as can be readily seen from a consideration of the general electrical constants of the circuitry involved. An operational amplifier of the type described for analog computing purposes conventionally is so designed as to have an open loop gain B which is very large. In some commercially available amplifiers this value is $10^7$ or greater. With such an amplifier, if a voltage of $(1 \times 10^{-7})$ volts is present at the summing point 45, the output voltage of the amplifier 35 would be one volt. For any particular amplifier, the characteristic representing the operation of the amplifier can be expressed as output voltage A, the amplifier voltage being equal to the grid voltage at the summing point times the gain of the amplifier, that is:

(7) $$A = BE_{45}$$

or $$E_{45} = \frac{\overline{A}}{B}$$

In order to illustrate the accuracy of neglecting the terms in Equation 6 involving $E_{45}$, the voltage at the summing point in the integrator, a practical example is now given. In most amplifiers of the type described, the maximum output voltage is limited to about 100 volts. Therefore, the maximum value of $\overline{A}$ is 100 volts. Thus in Equation 7:

$$E_{45} = \frac{100}{1 \times 10^7} = 1 \times 10^{-5} \text{ volts}$$

or $E_{45}$ is equal to 10 microvolts. Since this shows that $E_{45}$ is a very minute quantity and can be neglected, Equation 6 becomes:

(8) $$K_1 C\theta\frac{d\overline{A}}{dt} = -\frac{1}{R_{34}}\left(AK\frac{d\theta}{dt}\right)$$

Finally, the output voltage $\overline{A}$ of the integrator 33 is given by solving for this quantity from Equation 8. It may be expressed:

$$\frac{d\overline{A}}{dt} = -\frac{AK}{R_{34}K_1 C\theta}\frac{d\theta}{dt}$$

or $$d\overline{A} = -\frac{K}{K_1} \cdot \frac{A}{R_{34}C\theta}\frac{d\theta}{dt}dt$$

Simplifying this equation, let $$K_2 = \frac{K}{K_1}$$

then:

(9) $$d\overline{A} = -\frac{K_2}{R_{34}\theta C} \cdot A\frac{d\theta}{dt}dt$$

Integrating both sides for $\overline{A}$ from 0 to some positive value:

(10) $$\overline{A} = -\frac{K_2}{R_{34}\theta C}\int_0^t A\frac{d\theta}{dt}dt$$

(11) $$\overline{A} = -\frac{K_2}{R_{34}\theta C}\int_0^t A\,d\theta$$

(12) $$\overline{A} = -\left(\frac{K_2}{R_{34}C}\right)\cdot\frac{1}{\theta}\int_0^t A\,d\theta$$

Thus, the voltage output $\overline{A}$ of the integrator to ground is continuously equal to the summation of the instantaneous voltages for the total time for which the scan has been made divided by this total time. This is a time average of the trace quantity scanned for the period for which the chart is scanned, the value sought.

While particular embodiments of this invention have been illustrated and described, modifications thereof will occur to those skilled in the art. It is to be understood, therefore, that this invention is not to be limited to the particular details disclosed, and it is intended in the appended claims to cover all modifications within the spirit and scope of this invention.

What is claimed is:

1. A manually operable trace averager comprising a chart turntable, means for driving said turntable, an arm for following a trace variable on a chart on said turntable, a potentiometer having a contactor operable in accordance with displacement of said trace following arm, a direct current tachometer generator operable in accordance with the speed of said turntable and connected to said trace following arm potentiometer whereby a voltage is impressed thereon proportional to the speed of said turntable, a second potentiometer having a contactor operably connected so as to have a displacement representative of the angle of rotation of said turntable, means including a high gain direct current amplifier integrator with an input and output, the input connected to said trace following arm potentiometer to provide a voltage thereon responsive to the position of said contactor of said latter potentiometer for integrating the voltage therefrom with respect to the chart time interval and the output connected to said second potentiometer for dividing such integration by the time interval whereby a direct current voltage is obtained from said integrator directly proportional to the average of the trace variable.

2. A chart trace value averaging apparatus including means for advancing the chart along the coordinates representing a first chart variable, means responsive to the rate of said advance for providing a first voltage in accordance with such rate, means for modifying said first voltage according to another chart coordinate which is proportional to a trace variable, said modified voltage being continuously representative of said trace variable at the concurrent value of said first chart variable, means continuously representative of said first chart variable coordinate in accordance with the advance of the chart, an electronic integrator, means impressing said modified voltage as an input to said electronic integrator, means for continuously dividing the integration by said electronic integrator of said trace variable by the instantaneous value of said chart advance representative means, and means for measuring said divided output of said integrator thereby providing a measurement of the average of said trace variable.

3. A manually operable electronic analog trace averager comprising a chart turntable, means including a motor for driving said turntable, a tracing arm for manually following a trace on a chart on said turntable and a potentiometer assembly connected to provide a potentiometer displacement proportional to the trace variable in accordance with the position of said tracing arm, means including a generator operable at a speed proportional to the speed of said turntable and electrically connected to said trace arm potentiometer whereby a voltage is impressed thereon proportional to the speed of said turntable, a second potentiometer having a variable contactor, means operably connecting said second potentiometer contactor to said turntable whereby the displacement of said second potentiometer represents the angle of advance rotation of said turntable, a high gain direct current amplifier integrator, means for impressing the generator voltage as modified by said tracing arm potentiometer as an input to said integrator, means connecting the integrator output to said second potentiometer, a feedback condenser, means connecting the voltage of said second potentiometer contactor to one side of said condenser, means connecting the other side of said condenser as an input to said integrator whereby the output voltage of said integrator is continuously proportional to the average of the trace variables.

4. A manually operable trace averager comprising a chart turntable, means including a variable speed motor with suitable gearing and clutch assembly for driving said turntable, means including a generator operable at a speed proportional to the speed of said turntable for generating a voltage responsive to the speed of said turntable, a tracing arm for manually following a trace variable on a chart on said turntable, a potentiometer assembly operable by said tracing arm to provide a potentiometer displacement proportional to the trace variable in accordance with the position of said tracing arm, means connecting said generator across said tracing arm potentiometer whereby the voltage from said generator is modified by said potentiometer in accordance with said trace variable, a second potentiometer having a variable voltage contactor, means operably connecting said second potentiometer contactor to said turntable whereby the displacement of said second potentiometer contactor represents the angle of advance rotation of said turntable, a high gain direct current amplifier integrator, means impressing the generator voltage as modified by said trace arm potentiometer as an input to said integrator, means connecting the integrator output to said second potentiometer, a feed-back condenser, means impressing the voltage of said second potentiometer contractor on one side of said condenser, means connecting the other side of said condenser as an input to said integrator whereby the output voltage of said integrator is continuously proportional to the average of the trace variable for the advance rotation of the chart on said turntable, and means for measuring the output voltage of said integrator in terms indicative of the average of the trace variable.

5. An electronic analog trace averager comprising a chart advancing means, means for providing a voltage responsive to the speed of said chart advancing means, means for following a trace on a chart on said chart advancing means, a potentiometer connected to and operable by said trace following means, means for impressing said chart speed responsive voltage across said trace following means potentiometer whereby said voltage is modified as the output voltage of said potentiometer in accordance with said trace variable, a second potentiometer having a variable voltage contactor, means operably connecting said second potentiometer contactor to said chart advancing means whereby the displacement of said second potentiometer contactor varies in accordance with the advance of the chart, a high gain direct current amplifier integrator, means for impressing said trace following means potentiometer output voltage as an input of said integrator, means connecting the integrator output to said second potentiometer, a feed-back condenser, means connecting said second potentiometer contactor to one side of said condenser, means connecting the other side of said condenser as an input to said integrator whereby the output voltage of said integrator is continuously proportional to the average of the trace variable for the advance of the chart, and means for measuring the output voltage of said integrator in terms indicative of said average of the trace variable.

6. A trace averager comprising a chart advancing means, means for driving said chart advancing means, means for providing a voltage responsive to the speed of said chart advancing means, means for following a trace variable on a chart on said chart advancing means, a potentiometer operable by said trace following means, means for connecting said chart speed responsive voltage across said trace following means potentiometer whereby said voltage is modified as the output voltage of said potentiometer in accordance with said trace variable, a second potentiometer having a variable voltage connection, means operably connecting said second potentiometer variable voltage connection to said chart advancing means whereby the displacement of said second potentiometer variable voltage connection varies in accordance with the advance of said chart, a high gain direct current amplifier integrator, means for impressing said trace following means potentiometer output voltage as an input to said integrator, means connecting the integrator output to said second potentiometer, a feed-back condenser, means connecting the voltage output of said second potentiometer variable voltage connection to one side of said condenser, means connecting the other side of said condenser as an input to said integrator whereby the output voltage of said integrator is continuously proportional to the average of the trace variable for the advance of the chart, and means for measuring the output voltage of said integrator in terms indicative of said average of the trace variable.

7. An electronic analog chart trace averager comprising a chart advancing means, means including a variable speed motor for driving said chart advancing means, means including a generator operable at a speed proportional to the speed of said chart advancing means for generating a voltage responsive to said speed, a tracing arm for following a trace variable on a chart on said chart advancing means, a potentiometer assembly connected to and operable by said tracing arm for providing a potentiometer output voltage proportional to the trace variable in accordance with the position of said tracing arm, means connecting said generator across said tracing arm potentiometer whereby the voltage from said generator is modified as the output voltage of said potentiometer in accordance with said trace variable, a second potentiometer having a variable voltage connection, means operably connecting said second potentiometer variable voltage connection to said chart advancing means whereby the displacement of said second potentiometer variable voltage connection varies in accordance with the advance of said chart, a high gain direct current amplifier integrator, means for impressing said tracing arm potentiometer output voltage as an input to said integrator, means connecting the integrator output to said second potentiometer, a feed-back condenser, means connecting the voltage output of said second potentiometer variable voltage connection to one side of said condenser, means connecting the other side of said condenser as an input to said integrator whereby the output voltage of said integrator is continuously proportional to the average of the trace variable for the advance of the chart, and means for measuring the output voltage of said integrator in terms indicative of said average of the trace variable.

References Cited by the Examiner

UNITED STATES PATENTS 2,967,749   1/1961   Strickler _____ 235—183 X

MALCOLM A. MORRISON, *Primary Examiner.*

I. KESCHNER, *Assistant Examiner.*